Nov. 8, 1949

G. V. MOREY 2,487,067

METHOD FOR MAKING TUBULAR ARTICLES
OF PLASTIC SHEET MATERIAL

Filed Aug. 11, 1945

INVENTOR.
GEORGE V. MOREY.
BY
Ralph L. Chappell
ATTORNEY.

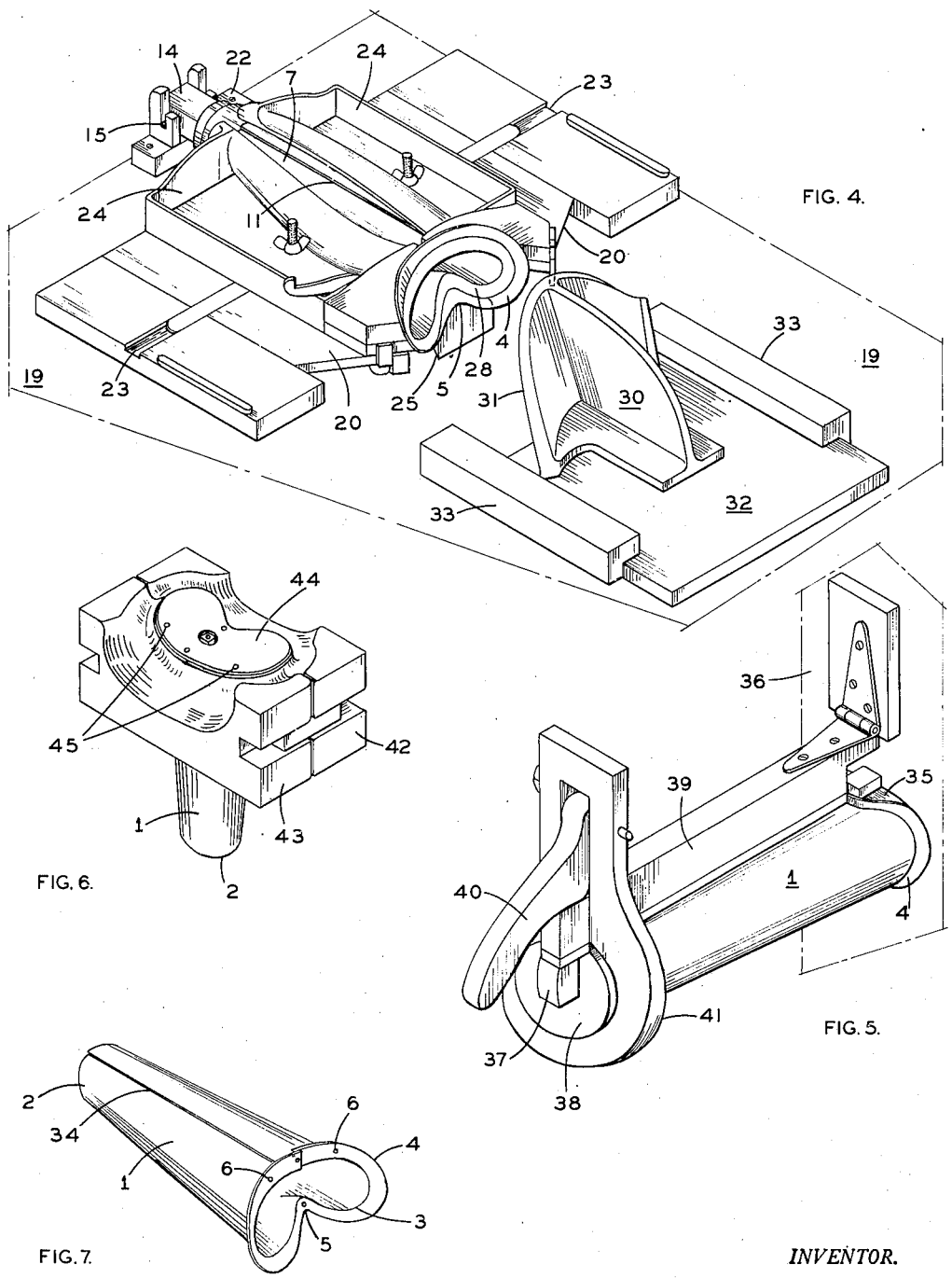

Patented Nov. 8, 1949

2,487,067

UNITED STATES PATENT OFFICE 2,487,067

METHOD FOR MAKING TUBULAR ARTICLES OF PLASTIC SHEET MATERIAL

George V. Morey, Upper Darby, Pa.

Application August 11, 1945, Serial No. 610,390

11 Claims. (Cl. 18—56)

(Granted under the act of March 3, 1883, as amended April 30, 1928; 370 O. G. 757)

This invention relates to new and useful improvements in methods for making articles of plastic materials, and more particularly to a novel method for making plastic eye shields or visors for the indicator screens of radar equipment.

Modern military aircraft, and particularly carrier-borne naval aircraft, are provided with radar equipment of the search type designed primarily for the detection of surface vessels and other aircraft. Such equipment comprises a screen or indicator on which the reflected target echoes appear and indicate roughly the size and contour of the target, and also give an accurate indication of the direction and distance of the target. This indicator screen is generally located in front of and spaced from the pilot of the plane, for example, upon the instrument panel thereof and, in order to render the target echoes appearing on the screen most clearly to the pilot, it is the practice to provide a generally tubular light shield or visor which circumscribes the screen and extends therefrom in the direction of the pilot to substantially bridge the gap or space between the radar screen and the eyes of the pilot.

The problems presented in providing a satisfactory shield or visor of the type described included the solution of two substantially contradictory requirements for such a device. In the first place, reflected target echoes appearing upon the indicator screen are more clearly detected and apparent to an observer in dark surroundings than in daylight, and hence it is desirable that the shield or visor be relatively light impervious so as to exclude a substantial part of the surrounding light from the field of vision of a person observing the screen through such a visor or shield. On the other hand, it is necessary also that the pilot of a plane when observing the radar screen through the tubular shield or visor be able, at the same time, to observe laterally through the wall of the visor the various flight instruments and indicators on the control panel of the plane. This requirement, therefor, makes it necessary that the shield or visor have sufficient transparency to permit the pilot to observe the instruments on the control panel laterally through the wall of the shield or visor while observing the radar screen longitudinally through the visor, and at the same time be sufficiently light impervious to provide efficient detection and observation of the reflected target echoes appearing upon the indicator screen.

One material which satisfactorily meets both of these requirements is a special blue colored transparent Vinylite plastic composition manufactured in sheet form by Union Carbon and Carbide Company under the designation VSF–6686–B Blue. While this material proved entirely satisfactory in that it is sufficiently light impervious to exclude surrounding daylight from the field of vision of a person observing the radar screen, and at the same time is sufficiently transparent to permit observation therethrough of the control panel instruments, considerable difficulty was encountered in forming a satisfactory tubular shield or visor from this material without adversely affecting its transparency and the ability to be able to observe instrument indications through the material. Not only did this material exhibit a tendency to decrease in transparency in the process of forming the sheet into a suitable tubular visor form, but the material also showed a tendency to become streaked or clouded in localized areas thereby causing variations in the color density (transparency) which resulted in objects observed through the wall of a shield or visor being blurred and distorted. The necessity for providing a shield or visor having the transparency specified for the original sheet material, and which is free from streaks and variations in color density resulting in imperfect and distorted vision through the wall of the visor, will be obvious.

Shields or visors of the type here involved are of tubular form substantially circular at the base or screen end from which they flare slightly outwardly terminating at their other or face end in an outwardly directed flange portion against which the face of the pilot is adapted to rest upon a peripheral cushion secured thereto, a suitable recess being formed in the lower course of the face end and flange portion of the visor to provide clearance for the nose of the observer. Apart from the difficulties encountered in the formation of suitable visors of the proper transparency and free of streaks and transparency variations as described, considerable difficulty also was encountered in forming visors having the face flange integral therewith, and prior to the present invention it was necessary that the face flange be made as a separate piece and cemented to the visor proper after fabrication of the latter. This proved unsatisfactory for the reason that the face flange very often broke loose from the visor proper and precluded the observer from placing his face tightly against the visor with the result that the surrounding light penetrated the observer's field of vision and reduced the efficiency of detection and perception of reflected target echoes appearing upon the screen.

Accordingly, and with the foregoing in mind, the principal object of the present invention is to provide a novel method for making shields or visors of the type described which does not affect the transparency of the original material, and which provides a shield or visor that is entirely free of streaks, color density variations and other blemishes capable of blurring or distorting vision through the wall of such shield or visor.

Another object of the invention is to provide a novel method for making a shield or visor of the stated character which is of unitary construction having an integral face flange at the observation end thereof.

A further object of the present invention is to provide a novel method for making shields or visors of the character described, which is comparatively inexpensive to carry out and highly efficient in use to produce shields or visors characterized by and embodying the described construction and physical properties.

These and other objects of the invention, and the various features and details of the method thereof, are hereinafter fully set forth and described with reference to the accompanying drawings, in which.

Figure 3:
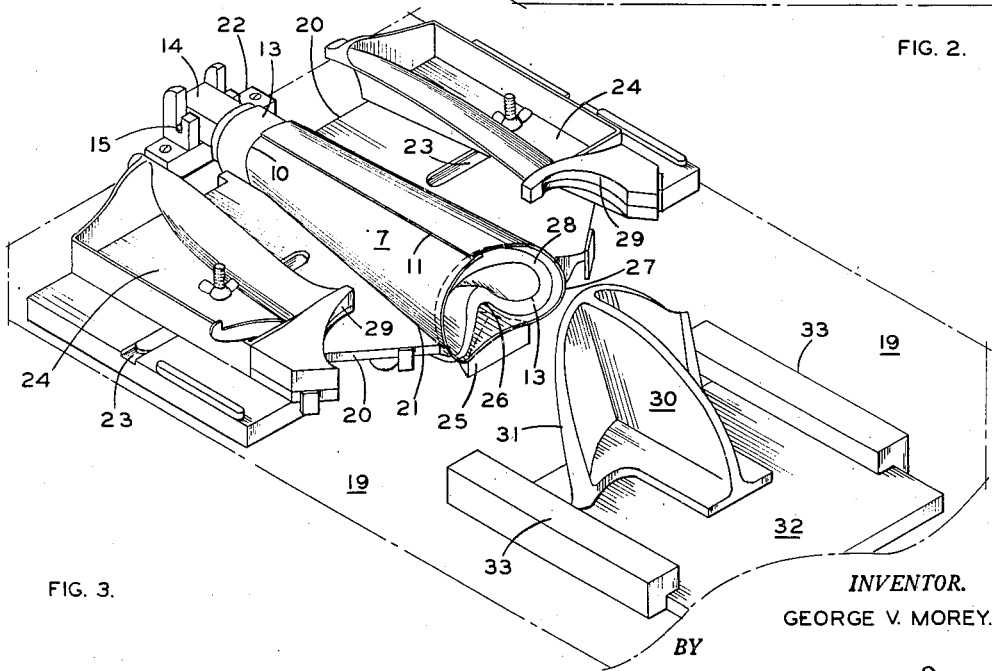
Fig. 3 is a view in perspective of an apparatus employed to perform certain forming operations upon the heated sheet of material, showing the mandrel with said sheet wrapped thereabout properly positioned in said apparatus prior to the forming and setting operations to be performed thereby.

Fig. 4. is a view similar to Fig. 3 showing certain parts of the apparatus in the material forming and setting position.

Fig. 5 is a view in perspective of apparatus employed to properly gauge and dimension the opposite ends of the formed visor and provide a secure seam or joint lengthwise thereof.

Fig. 6 is a view in perspective of apparatus providing a support for the formed and seamed visor and embodying a template for trimming the face flange thereof to the desired size and contour, as well as for drilling therethrough a plurality of predeterminedly located openings; and Fig. 7 is a view in perspective of a radar screen shield or visor made according to the present invention.

A radar screen visor made according to the present invention is shown in Fig. 7 of the drawings, and is of unitary, integral construction comprising a generally tubular longitudinally seamed body portion 1 which flares outwardly from an accurately dimensioned and contoured circular base or screen end 2 to an accurately dimensioned and contoured face end 3 which is bounded by an integral laterally extending flange portion 4 having formed therein and in the adjacent portion of the body 1 of the visor a nose bridge or recess 5 to provide clearance for the nose of a person observing the radar screen through the visor. The flange portion 4 is accurately cut and contoured and there is formed in the flange a plurality of predeterminedly located openings 6 for attachment of a resilient cushion or face pad (not shown) to the outer face of said flange 4.

According to the present invention, a visor constructed in the manner hereinbefore described, and shown in Fig. 7 of the drawings, preferably is fabricated from blue colored transparent Vinylite sheet material, for example, as manufactured by Union Carbon and Carbide Company, New York, under the designation VSF-6686-B Blue. This material has been determined to provide not only both the desired light exclusion properties and the transparency to permit observation at an angle therethrough of objects located exteriorly adjacent a visor fabricated of the material, but also is characterized by its uniformity and freedom from streaks, blemishes and variations in color density (transparency). The visors are fabricated from flat sheets of the described material which are approximately 0.040 inch thick.

Figure 1:
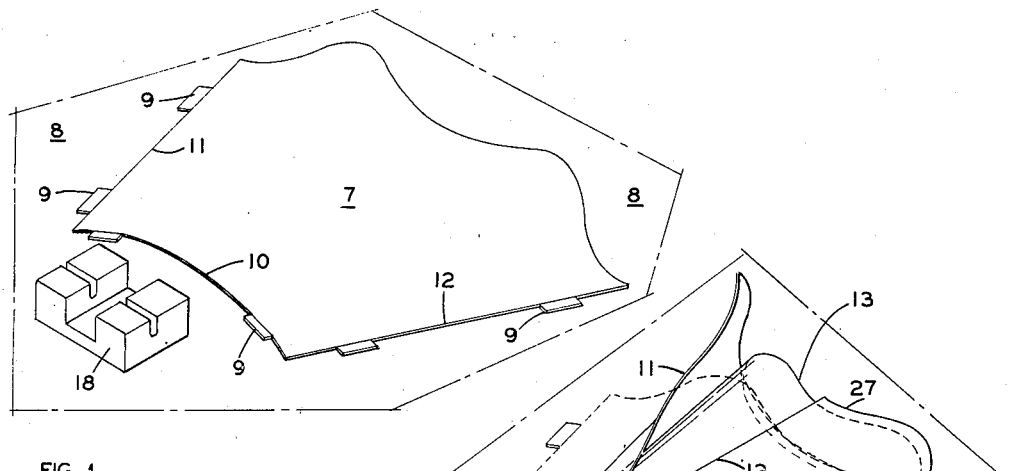
Fig. 1 is a view in perspective showing a pre-cut sheet of the selected material positioned upon a surface preparatory to being heated.

Prior to formation of the visors, there is die-cut from a sheet of the described material, a flat sheet portion having the shape or configuration shown in Fig. 1 of the drawings and of sufficient size to produce a finished visor of the required dimensions. In accordance with the present invention, a flat sheet 7 of the material, cut to the predetermined shape and size required, is placed flat upon a horizontal surface or support 8 and predeterminedly positioned and located thereon by means of a plurality of guide members 9 secured upon said support 8 and arranged to engage and fixedly position said sheet 7 thereon along the base and opposite side edges 10, 11 and 12, respectively, thereof as and in the manner illustrated.

After the pre-cut sheet 7 has been properly fixed in position upon the support 8 by means of the guide members 9, the sheet 7 is heated to a predetermined temperature, for example, by means of a bank of infra-red lamps (not shown) which may be adjustably suspended above the support 8 and sheet 7 thereon. The temperature to which the sheet is heated, of course, will vary for different materials and may be best determined by experimentation in each case. In the case of the particular material hereinbefore mentioned, best results have been obtained with sheets of the material heated to a temperature of about 130° F.

Figure 2:
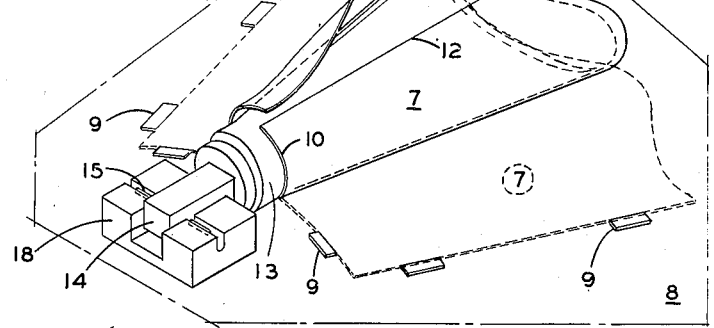
Fig. 2 is a view similar to Fig. 1 showing a mandrel or former positioned thereon and the manner in which the heated sheet of material is formed about the mandrel.

When the pre-cut sheet 7 has been heated to the required temperature as described there is positioned upon the heated sheet, in the relation shown in Fig. 2, a former 13 having substantially the size and shape of the finished visor that is desired to produce. Extending axially endwise from the base end of the former 13 is a guide member 14 having therein a cross-pin or the like 15, and this member 14 and its pin 15 are arranged to fit accurately within correspondingly shaped recesses formed in a guide fixture 18 which is secured upon the support 8 in predetermined relation with respect to the sheet guides 9 so that the former 13 is accurately positioned and disposed upon the heated sheet 7. In this manner it will be apparent that the base end edge 10 of the heated sheet is predeterminedly and accurately positioned lengthwise with respect to the former 13, and it is to be noted that the dimension of the sheet 7 lengthwise of the former 13 is such that the face end edge portion 27 of the sheet projects outwardly beyond the face end of the former 13.

Following positioning of the former 13 upon the heated sheet 7 as described, the heated sheet 7 is manually wrapped and formed about the said former, for example, in the manner illustrated in Fig. 2 of the drawings, with the opposite side edge portions 11 and 12 of the sheet disposed in lapped relation lengthwise along the upper surface of the former 13. When this has been accomplished, the mandrel, with the sheet wrapped thereabout as described, is placed in suitable apparatus that is operable to perform further forming operations upon the heated material.

This apparatus may be constructed, for example, as shown in Fig. 3 of the drawings, and may comprise a horizontal support 19 on which is secured a base member 20 having a central recessed portion 21 contoured to conform to and receive the former 13 with the heated sheet 7 thereon. Secured upon the support 19 endwise of the contoured recess 21 of the base 20 is a guide fixture 22 constructed to receive the guide portion 14 and pin 15 of the mandrel and thereby predeterminedly position the same and the heated sheet thereon accurately in a direction axially or lengthwise of the base 20. The position of the base end edge 10 of the sheet 7 is thus fixedly located with respect to the base 20 of the apparatus.

Slidably mounted in slots 23, 23 formed in the base 20 for movement toward and away from the sheet covered former 13 in a direction substantially perpendicular to the axis thereof, are complementary sections 24, 24 constructed and arranged, when in their innermost position, to cooperate with one another and with the contoured recess 21 in the base 20, and substantially surround or enclose the heated sheet 7 embracing the former 13. It is to be noted that these sections 24, 24 function to retain the sheet about the former 13, and that clearance is provided for the lapped opposite side edge portions 11 and 12 of the formed sheet which extend lengthwise along the upper surface of the former 13.

An opening is provided in the base 20 for the passage therethrough of a forming element 25 which is actuated upwardly to engage the face end portion of the formed sheet and form therein the angular recess 5 which bridges the nose of the observer. To this end there is formed in the mandrel a complementary contoured recess 26 cooperable with the element 25 for accurately forming the sheet material to provide the recess 5 therein. As shown, the observation end edge portion 27 of the formed sheet 7 projects endwise beyond the adjacent end face 28 of the former 13. This end face 28 is appropriately contoured to conform substantially to the curvature of the face of an observer, and the adjacent end faces 29, 29 of the sections 24, 24 are similarly contoured and disposed so as to provide laterally extending surface portions outwardly adjacent the end face 28 of the former 13 when said sections are in their innermost positions shown in Fig. 4 of the drawings.

In forming the visor according to the present invention, when the former 13 with the sheet 7 wrapped thereabout has been positioned upon the base 20 as hereinbefore described and shown in Fig. 3, the sections 24, 24 are moved inwardly to the positions shown in Fig. 4 so as to overlie the sheet, and the forming element 25 then is actuated upwardly to form, in cooperation with the recess 26 in the former 13, the nose bridge or recess 5 in the visor. The forming element or die 25 is maintained in the raised or sheet engaging position until the projecting edge portion 27 of the sheet 7 is manually formed outwardly so as to overlie the adjacent contoured end faces 29, 29 of the sections 24, 24, the base 20 and element 25 in the manner shown in Fig. 4 to provide the integral laterally extending flange portion 4 previously described with reference to Fig. 7 of the drawings. Upon formation manually of the flange 4, a member 30 having a face 31 appropriately contoured to conform to the configuration of the end faces 29, 29 of the sections 24, the base 20 and the element 25 against which the flange 4 is formed, is actuated into abutting relation endwise against the face of the flange 4. This member 30 may be mounted for sliding movement upon a carriage 32 movable on the support 19 within guide members 33.

The member 30 and the element 25 are maintained in contact with the respective portions of the sheet for a relatively short period of time to cause the sheet material engaged thereby to become set in the particular position and shape into which formed, and a period of from about 5 to 10 seconds has been found to be entirely satisfactory in the case of the particular sheet material hereinbefore mentioned. In addition, and for the purpose of maintaining the edge portions of the sheet material from cooling too rapidly after the heated sheet is removed from the support 8, a suitable source of heat preferably is provided in or beneath the base 20 to maintain the sheet material at the face end of the visor in a formable condition until formation of the nose bridge 5 and the extending flange 4 is accomplished in the manner previously described. When the nose bridge 5 and flange 4 have been formed and set, the member 30, element 25 and sections 24, 24 may be retracted, after which the former 13 with the formed sheet thereon is removed from the apparatus, and the formed sheet in turn removed from the former 13 by sliding the same endwise therefrom.

Following removal of the formed sheet from the former 13, the lapped edges 11 and 12 of the formed sheet are bonded securely together to provide a strong, permanent seam 34 lengthwise thereof (see Fig. 7). Preparatory to forming the seam 34 it is necessary that the opposite ends of the formed sheet be suitably supported and gauged so that they will have the exact dimensions required after the lapped sheet edges 11 and 12 are secured together. Accurate dimensioning of the end openings of the formed sheet and formation of the lapped seam joint 34 therein, may be accomplished, for example, in a clamp device of the character shown in Fig. 5 of the drawings. Such a device may comprise face end gauge 35 dimensioned and contoured to receive thereabout the face end of the formed sheet in the manner and relation shown. The gauge 35 may be secured upon a suitable support 36, and extending from the said gauge 35 outwardly therefrom and from the support 36, is a member 37 that extends lengthwise through the formed sheet when mounted in the clamp device.

The member 37 is arranged to underlie the lapped edges 11 and 12 thereof, and extends entirely through the formed sheet so as to receive thereon a gauge plug 38 arranged to fit inwardly of the base end of the formed sheet as shown.

The formed sheet is passed over the member 37 and the face end thereof is fitted upon the gauge 35, after which the gauge plug 38 is inserted into the base end of the formed sheet until it engages a suitably located stop (not shown) provided on the member 37. A suitable adhesive then is applied to the surfaces of the lapped edges 11 and 12 of the formed sheet, after which the adhesive coated surfaces thereof are held together under adequate pressure until the lapped edges 11 and 12 are securely bonded together. This may be accomplished by providing the clamp device with a cushioned arm or the like 39 which is suitably hinged to the support 36 and arranged, in the lowered position illustrated, to overlie the lapped edges of the formed sheet and exert pressure thereon against the underlying support furnished by the member 37. The cushioned arm 39 may be clamped upon the lapped edges 11 and 12 of the formed sheet by means of an eccentric lever member 40 operable within a yoke 41 that embraces the base end portion of the formed sheet having gauge plug 38 fitted therein.

The selection of a suitable adhesive to permanently bond together the lapped edges 11 and 12 will depend upon the particular sheet material employed, and in the case of the Vinylite plastic hereinbefore mentioned, superior results have been obtained by the use of ethyl acetate. The formed sheet with the adhesive on the lapped surfaces thereof is maintained clamped in the device for a length of time sufficient to provide a seam 34 that is of adequate strength and substantially permanent and, in the case of the particular sheet material and adhesive herein mentioned, a period of about from 30 to 40 minutes insures satisfactory results.

After formation of the seam 34 as described, the resulting visor is removed from the clamping device and the flange 4 thereof is trimmed to the desired dimensions and a plurality of holes 6 are drilled through said flange for the purpose of attaching to the outer face thereof a suitable cushion (not shown) against which the face of an observer may bear. These operations may be accomplished in a suitable jig or support, for example, constructed as shown in Fig. 6 of the drawings, and comprising a pair of complementary sections 42 and 43 which are hingedly connected together and provided in their abutting faces with complementary recesses cooperable in the closed position of said sections to provide a receptacle which is contoured to accurately receive the face end portion of the visor with its laterally extending flange 4 overlying the adjacent upper surface portions of the sections 42 and 43 which are contoured to conform to the formed contour of the flange 4 of a visor. When a visor is properly positioned in the sections 42 and 43, a core or mandrel 44 is inserted into the face end of the visor and this core 44 is provided with a flange portion of predetermined dimensions which overlies the flange 4 of the visor. The visor flange 4 normally projects laterally outward beyond the overlying flange of the core member 44, and the latter functions as a guide or gauge for a suitable cutter or router which may be employed to trim the visor flange 4 to conform to the dimensions and peripheral contour of the flange of the core or mandrel 44.

Suitable drill openings 45 are provided in the flange of the core member 44 at predetermined locations therein, and after the visor flange 4 has been trimmed as described, openings or holes 6 are drilled in said visor flange 4 using the openings 45 in the core member 44 as guides for the drill so that the holes 6 in the visor flange 4 are accurately located and formed therein. The visor may now be removed from the jig and is complete except for the mounting of the face cushion upon the visor flange 4 and the securing of the base end of the visor in a suitable mounting by which it is attached and secured in position with respect to the indicator screen of the radar equipment—operations which form no part of the present invention.

A visor fabricated in accordance with the foregoing description from Vinylite plastic sheet material hereinbefore mentioned is of unitary construction having an integral face flange at one end, and which is characterized not only by the same degree of transparency as the original sheet material, but which is entirely free from streaks, variations in color density and other blemishes and effects that would impair the observance of objects through the material.

Thus the present invention provides a novel method for making shields or visors of the type described which does not affect the transparency of the original material and which provides a shield or visor that is entirely free of streaks, color density variations and other blemishes capable of blurring or distorting vision through the wall of such shield or visor. The invention also provides a method for making shields or visors of the stated character which are of unitary construction having at the face end thereof an integral flange to receive a cushion against which the face of the observer may bear. Furthermore, the invention provides a method for making shields or visors of the character described which is comparatively inexpensive to practice, and which is highly efficient in the production of shields or visors that are characterized by and embody the described construction and physical properties.

While a particular process embodying the method of the present invention has been illustrated and described herein, it is not intended that the invention be limited to such disclosure, and changes and modifications may be made therein and thereto within the scope of the claims.

The invention described herein may be manufactured and used by or for the Government of the United States of America for governmental purposes without the payment of any royalties thereon or therefor.

I claim:

1. In the method of making flanged instrument visors of the character described from plastic sheet material, the steps which comprise heating to a predetermined temperature a sheet of selected plastic material of predetermined size and configuration, the said sheet provided with two opposing edges adapted to form the base end and face end of the completed visor structure, respectively, and two opposing side edges, positioning a former upon the heated sheet in predetermined relation with respect thereto so that said former is accurately positioned lengthwise with respect to the base end edge of the sheet and extends thereover intermediate the side edges thereof with the face end edge of the sheet projecting endwise beyond the former, wrapping the heated sheet about the said former to provide a tubular structure with the opposite side edges of the sheet disposed in overlying relation lengthwise of the former and the face end edge portion of the sheet projecting endwise thereof, supporting the exterior surface of the heated sheet about the former to maintain the formed tubular shape thereof, indenting a portion of the face end of the formed tubular sheet exteriorly thereof to form a nose recess therein, and outwardly displacing the projecting face end edge of the formed tubular sheet against adjacent peripheral support surfaces to provide a lateral extending flange portion at the face end of said tubular sheet, said nose recess and flange portion of the sheet being formed while still supporting the exterior surface of the heated sheet about the former to maintain the formed tubular shape thereof.

2. In the method of making flanged instrument visors of the character described from plastic sheet material, the steps which comprise heating to a predetermined temperature a sheet of selected plastic material of predetermined size and configuration, the said sheet provided with two opposing edges adapted to form the base end and face end of the completed visor structure, respectively, and two opposing side edges, positioning a former upon the heated sheet in predetermined relation with respect thereto so that said former is accurately positioned lengthwise with respect to the base end edge of the sheet and extends thereover intermediate the side edges thereof with the face end edge of the sheet projecting endwise beyond the former, wrapping the heated sheet about the said former to provide a tubular structure with the opposite side edges of the sheet disposed in overlying relation lengthwise of the former and the face end edge portion of the sheet projecting endwise thereof, supporting the exterior surface of the heated sheet about the former to maintain the formed tubular shape thereof, indenting a portion of the face end of the formed tubular sheet exteriorly thereof to form a nose recess therein, outwardly displacing the projecting face end edge of the formed tubular sheet against adjacent peripheral support surfaces to provide a lateral extending flange portion at the face end of said tubular sheet, and bonding together the lapped side edges of the formed tubular sheet under pressure exerted thereon for a predetermined period of time while accurately supporting and dimensioning the base and face end openings of the formed tubular sheet.

3. In the method of making flanged instrument visors of the character described from plastic sheet material, the steps which comprise heating to a predetermined temperature a sheet of selected plastic material of predetermined size and configuration, the said sheet provided with two opposing edges adapted to form the base end and face end of the completed visor structure, respectively, and two opposing side edges, positioning a former upon the heated sheet in predetermined relation with respect thereto so that said former is accurately positioned lengthwise with respect to the base end edge of the sheet and extends thereover intermediate the side edges thereof with the face end edge of the sheet projecting endwise beyond the former, wrapping the heated sheet about the said former to provide a tubular structure with the opposite side edges of the sheet disposed in overlying relation lengthwise of the former and the face end edge portion of the sheet projecting endwise thereof, supporting the exterior surface of the heated sheet about the former to maintain the formed tubular shape thereof, indenting a portion of the face end of the formed tubular sheet exteriorly thereof to form a nose recess therein, outwardly displacing the projecting face end edge of the formed tubular sheet against adjacent peripheral support surfaces to provide a lateral extending flange portion at the face end of said tubular sheet, accurately trimming the face end flange portion of the tubular sheet to the desired dimensions and contour, and forming openings in said flange portion at predetermined locations therein.

4. In the method of making flanged instrument visors of the character described from plastic sheet material, the steps which comprise heating to a predetermined temperature a sheet of selected plastic material of predetermined size and configuration, the said sheet provided with two opposing edges adapted to form the base end and face end of the completed visor structure, respectively, and two opposing side edges, positioning a former upon the heated sheet in predetermined relation with respect thereto so that said former is accurately positioned lengthwise with respect to the base end edge of the sheet and extends thereover intermediate the side edges thereof with the face end edge of the sheet projecting endwise beyond the former, wrapping the heated sheet about the said former to provide a tubular structure with the opposite side edges of the sheet disposed in overlying relation lengthwise of the former and the face end edge portion of the sheet projecting endwise thereof, supporting the exterior surface of the heated sheet about the former to maintain the formed tubular shape thereof, indenting a portion of the face end of the formed tubular sheet exteriorly thereof to form a nose recess therein, outwardly displacing the projecting face end edge of the formed tubular sheet against adjacent peripheral support surfaces to provide a lateral extending flange portion at the face end of said tubular sheet, bonding together the lapped side edges of the formed tubular sheet under pressure exerted thereon for a predetermined period of time while accurately supporting and dimensioning the base and face end openings of the formed tubular sheet, accurately trimming the face end flange portion of the tubular sheet to the desired dimensions and contour, and forming openings in said flange portion at predetermined locations therein.

5. In the method of making flanged instrument visors of the character described from plastic sheet material, the steps which comprise heating to a predetermined temperature a sheet of selected plastic material of predetermined size and configuration, the said sheet provided with two opposing edges adapted to form the base end and face end of the completed visor structure, respectively, and two opposing side edges, positioning a former upon the heated sheet in predetermined relation with respect thereto so that said former is accurately positioned lengthwise with respect to the base end edge of the sheet and extends thereover intermediate the side edges thereof with the face end edge of the sheet projecting endwise beyond the former, wrapping the heated sheet about the said former to provide a tubular structure with the opposite side edges of the sheet disposed in overlying relation lengthwise of the former and the face end edge portion of the sheet projecting endwise thereof, supporting the exterior surface of the heated sheet about the former to maintain the formed tubular shape thereof, indenting a portion of the face end of the formed tubular sheet exteriorly thereof to form a nose recess therein, outwardly displacing the projecting face end edge of the formed tubular sheet against adjacent peripheral support surfaces to provide a lateral extending flange portion at the face end of said tubular sheet, said nose recess and flange portion of the sheet being formed while still supporting the exterior surface of the heated sheet about the former to maintain the formed tubular shape thereof, and bonding together the lapped side edges of the formed tubular sheet under pressure exerted thereon for a predetermined period of time while accurately supporting and dimensioning the base and face end openings of the formed tubular sheet.

6. In the method of making flanged instrument visors of the character described from plastic sheet material, the steps which comprise heating to a predetermined temperature a sheet of selected plastic material of predetermined size and configuration, the said sheet provided with two opposing edges adapted to form the base end and face end of the completed visor structure, respectively, and two opposing side edges, positioning a former upon the heated sheet in predetermined relation with respect thereto so that said former is accurately positioned lengthwise with respect to the base end edge of the sheet and extends thereover intermediate the side edges thereof with the face end edge of the sheet projecting endwise beyond the former, wrapping the heated sheet about the said former to provide a tubular structure with the opposite side edges of the sheet disposed in overlying relation lengthwise of the former and the face end edge portion of the sheet projecting endwise thereof, supporting the exterior surface of the heated sheet about the former to maintain the formed tubular shape thereof, engaging and displacing a portion of the face end of the formed tubular sheet exteriorly thereof to form a nose recess therein, outwardly displacing the projecting face end edge of the formed tubular sheet against adjacent peripheral support surfaces to provide a lateral extending flange portion at the face end of said tubular sheet, said nose recess and flange portion of the sheet being formed while still supporting the exterior surface of the heated sheet about the former to maintain the formed tubular shape thereof, accurately trimming the face end flange portion of the tubular sheet to the desired dimensions and contour, and forming openings in said flange portion at predetermined locations therein.

7. In the method of making flanged instrument visors of the character described from plastic sheet material, the steps which comprise heating to a predetermined temperature a sheet of selected plastic material of predetermined size and configuration, the said sheet provided with two opposing edges adapted to form the base end and face end of the completed visor structure, respectively, and two opposing side edges, positioning a former upon the heated sheet in predetermined relation with respect thereto so that said former is accurately positioned lengthwise with respect to the base end edge of the sheet and extends thereover intermediate the side edges thereof with the face end edge of the sheet projecting endwise beyond the former, wrapping the heated sheet about the said former to provide a tubular structure with the opposite side edges of the sheet disposed in overlying relation lengthwise of the former and the face end edge portion of the sheet projecting endwise thereof, supporting the exterior surface of the heated sheet about the former to maintain the formed tubular shape thereof, engaging and displacing a portion of the face end of the formed tubular sheet exteriorly thereof for a predetermined time to form and set a nose recess therein, outwardly displacing the projecting face end edge of the formed tubular sheet against adjacent peripheral support surfaces to provide a lateral extending flange portion at the face end of said tubular sheet, said nose recess and flange portion of the sheet being formed and set while still supporting the exterior surface of the heated sheet about the former to maintain the formed tubular shape thereof, bonding together the lapped side edges of the formed tubular sheet under pressure exerted thereon for a predetermined period of time while accurately supporting and dimensioning the base and face end openings of the formed tubular sheet, accurately trimming the face end flange portion of the tubular sheet to desired dimensions and contour, and forming openings in said flange portion at predetermined locations therein.

8. In the method of making flanged instrument visors of the character described from plastic sheet material, the steps which comprise positioning a sheet of selected plastic material of predetermined size and configuration in predetermined fixed relation upon a supporting surface, the said sheet provided with two opposing edges adapted to form the base end and face end of the completed visor structure, respectively, and two opposing side edges, heating said sheet to predetermined temperature, positioning a former upon the heated sheet in predetermined relation with respect thereto so that said former is accurately positioned lengthwise with respect to the base end edge of the sheet and extends thereover intermediate the side edges thereof with the face end edge of the sheet projecting endwise beyond the former, wrapping the heated sheet about the said former to provide a tubular structure with the opposite side edges of the sheet disposed in overlying relation lengthwise of the former and the face end edge portion of the sheet projecting endwise thereof, supporting the exterior surface of the heated sheet about the former to maintain and set the formed tubular shape thereof, engaging and displacing a portion of the face end of the formed tubular sheet exteriorly thereof for a predetermined time to form and set a nose recess therein, outwardly displacing the projecting nose edge of the formed tubular sheet to provide a lateral extending flange portion at the face end of said tubular sheet, and engaging the outer face of the lateral extending end flange portion in the formed position thereof for a predetermined period of time to set the same, said nose recess and flange portion of the sheet being formed and set while still supporting the exterior surface of the heated sheet about the former to maintain the formed tubular shape thereof.

9. In the method of making flanged instrument visors of the character described from plastic sheet material, the steps which comprise positioning a sheet of selected plastic material of predetermined size and configuration in predetermined fixed relation upon a supporting surface, the said sheet provided with two opposing edges adapted to form the base end and face end of the completed visor structure, respectively, and two opposing side edges, heating said sheet to predetermined temperature, positioning a former upon the heated sheet in predetermined relation with respect thereto so that said former is accurately positioned lengthwise with respect to the base end edge of the sheet and extends thereover intermediate the side edges thereof with the face end edge of the sheet projecting endwise beyond the former, wrapping the heated sheet about the said former to provide a tubular structure with the opposite side edges of the sheet disposed in overlying relation lengthwise of the former and the face end edge portion of the sheet projecting endwise thereof, supporting the exterior surface of the heated sheet about the former to maintain and set the formed tubular shape thereof, engaging and displacing a portion of the face end of the formed tubular sheet exteriorly thereof for a predetermined time to form and set a nose recess therein, outwardly displacing the projecting nose edge of the formed tubular sheet to provide a lateral extending flange portion at the face end of said tubular sheet, pressing the outer face of the lateral extending end flange portion in the formed position thereof for a predetermined period of time to set the same, said nose recess and flange portion of the sheet being formed and set while still supporting the exterior surface of the heated sheet about the former to maintain the formed tubular shape thereof, and bonding together the lapped side edges of the formed tubular sheet under pressure exerted thereon for a predetermined period of time while accurately supporting and dimensioning the base and face end openings of the formed tubular sheet.

10. In the method of making flanged instrument visors of the character described from plastic sheet material, the steps which comprise positioning a sheet of selected plastic material of predetermined size and configuration in predetermined fixed relation upon a supporting surface, the said sheet provided with two opposing edges adapted to form the base end and face end of the completed visor structure, respectively, and two opposing side edges, heating said sheet to predetermined temperature, positioning a former upon the heated sheet in predetermined relation with respect thereto so that said former is accurately positioned lengthwise with respect to the base end edge of the sheet and extends thereover intermediate the side edges thereof with the face end edge of the sheet projecting endwise beyond the former, wrapping the heated sheet about the said former to provide a tubular structure with the opposite side edges of the sheet disposed in overlying relation lengthwise of the former and the face end edge portion of the sheet projecting endwise thereof, supporting the exterior surface of the heated sheet about the former to maintain and set the formed tubular shape thereof, engaging and displacing a portion of the face end of the formed tubular sheet exteriorly thereof for a predetermined time to form and set a nose recess therein, outwardly displacing the projecting nose edge of the formed tubular sheet to provide a lateral extending flange portion at the face end of said tubular sheet, pressing the outer face of the lateral extending end flange portion in the formed position thereof for a predetermined period of time to set the same, said nose recess and flange portion of the sheet being formed and set while still supporting the exterior surface of the heated sheet about the former to maintain the formed tubular shape thereof, and accurately trimming the face end flange portion of the tubular sheet to the desired dimensions and contour.

11. In the method of making flanged instrument visors of the character described from plastic sheet material, the steps which comprise positioning a sheet of selected plastic material of predetermined size and configuration in predetermined fixed relation upon a supporting surface, the said sheet provided with two opposing edges adapted to form the base end and face end of the completed visor structure, respectively, and two opposing side edges, heating said sheet to predetermined temperature, positioning a former upon the heated sheet in predetermined relation with respect thereto so that said former is accurately positioned lengthwise with respect to the base end edge of the sheet and extends thereover intermediate the side edges thereof with the face end edge of the sheet projecting endwise beyond the former, wrapping the heated sheet about the said former to provide a tubular structure with the opposite side edges of the sheet disposed in overlying relation lengthwise of the former and the face end edge portion of the sheet projecting endwise thereof, supporting the exterior surface of the heated sheet about the former to maintain and set the formed tubular shape thereof, engaging and displacing a portion of the face end of the formed tubular sheet exteriorly thereof for a predetermined time to form and set a nose recess therein, outwardly displacing the projecting nose edge of the formed tubular sheet to provide a lateral extending flange portion at the face end of said tubular sheet, pressing the outer face of the lateral extending end flange portion in the formed position thereof for a predetermined period of time to set the same, said nose recess and flange portion of the sheet being formed and set while still supporting the exterior surface of the heated sheet about the former to maintain the formed tubular shape thereof, bonding together the lapped side edges of the formed tubular sheet under pressure exerted thereon for a predetermined period of time while accurately supporting and dimensioning the base and face end openings of the formed tubular sheet, and accurately trimming the face end flange portion of the tubular sheet to the desired dimensions and contour.

GEORGE V. MOREY.

REFERENCES CITED

The following references are of record in the file of this patent:

UNITED STATES PATENTS

| Number | Name | Date |
|---|---|---|
| 329,273 | Chickering | Oct. 27, 1885 |
| 571,372 | Inch | Nov. 17, 1896 |
| 1,912,186 | Fullman et al. | May 30, 1933 |
| 2,169,315 | Yngve | Aug. 15, 1939 |